United States Patent [19]

Fermer et al.

[11] 4,187,879
[45] Feb. 12, 1980

[54] FLOW REGULATOR

[75] Inventors: Karl-Erik Fermer; Leif Hulthe, both of Jönköping, Sweden

[73] Assignee: AB Svenska Flaktfabriken, Nacka, Sweden

[21] Appl. No.: 889,976

[22] Filed: Mar. 24, 1978

[30] Foreign Application Priority Data

Mar. 31, 1977 [SE] Sweden ............................ 7703730

[51] Int. Cl.² .................................................. F16K 1/22
[52] U.S. Cl. ..................................... 137/601; 415/160
[58] Field of Search ................ 137/601; 415/160, 161, 415/162

[56] References Cited

U.S. PATENT DOCUMENTS

| 122,359 | 1/1872 | Case | 415/160 |
|---|---|---|---|
| 2,435,092 | 1/1948 | Meyer . | |
| 2,621,848 | 12/1952 | Bentley . | |

FOREIGN PATENT DOCUMENTS

| 1041203 | 10/1958 | Fed. Rep. of Germany . |
| 2113194 | 3/1971 | Fed. Rep. of Germany . |
| 2250559 | 3/1977 | Fed. Rep. of Germany . |
| 318054 | 7/1969 | Sweden . |

Primary Examiner—Robert G. Nilson
Attorney, Agent, or Firm—Dann, Dorfman, Herrell and Skillman

[57] ABSTRACT

A flow regulator for regulating a gas flow passing through a tubular casing containing a plurality of radial shafts, each carrying a pivotably adjustable blade and being fixedly secured at one end to said casing and at the other end to a concentric interior hub. A protruding crank on each adjusting blade is connected to an adjusting ring so that each blade is pivoted on its shaft axis when the ring is displaced.

10 Claims, 13 Drawing Figures

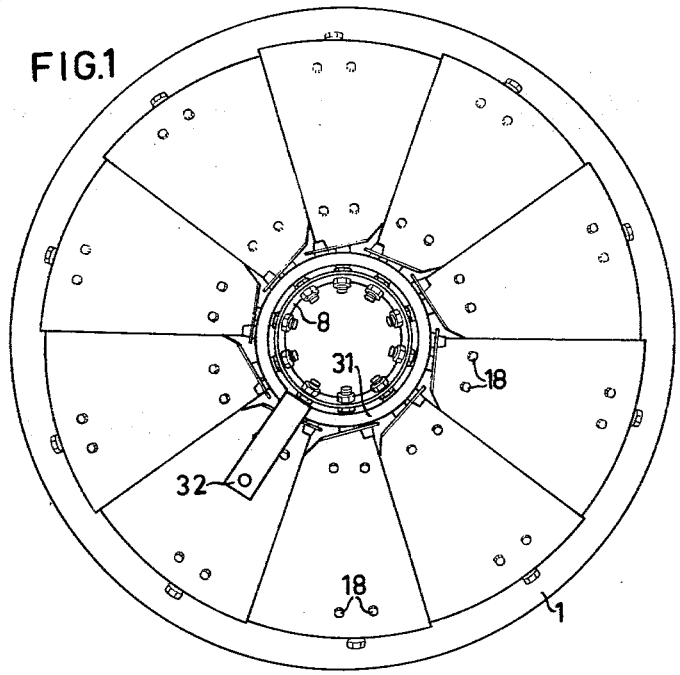
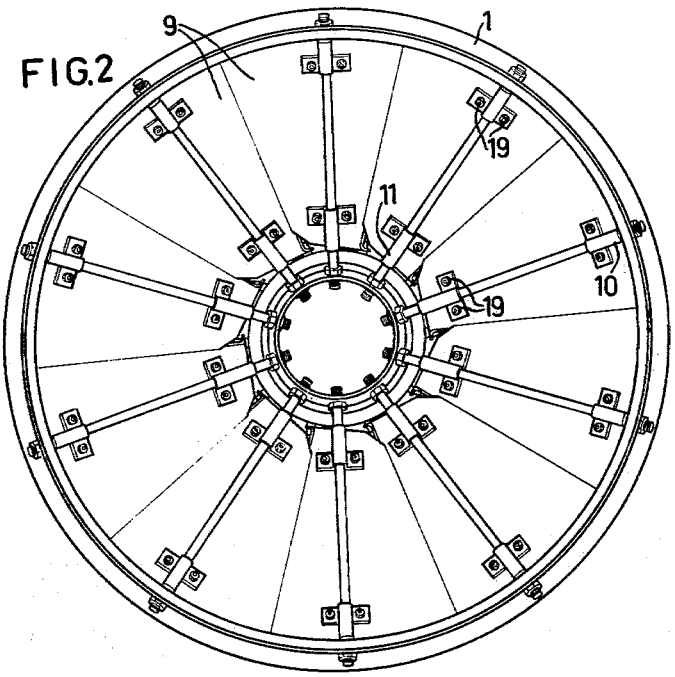

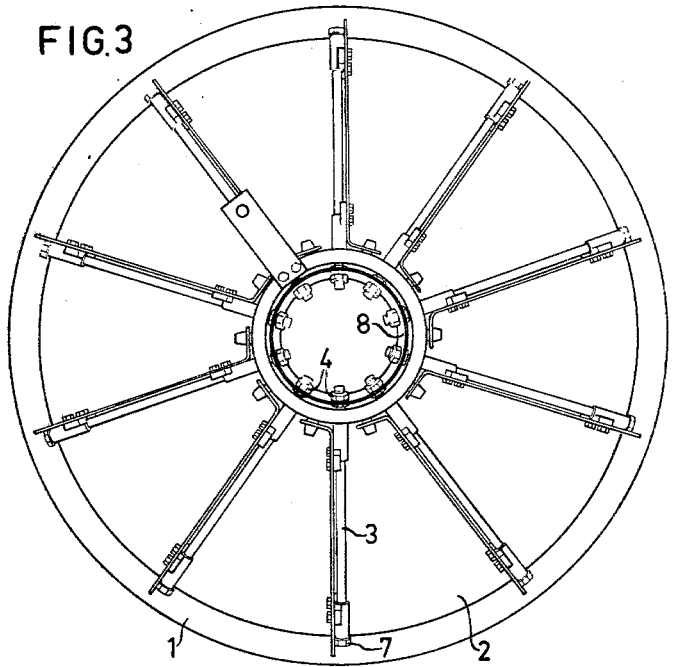
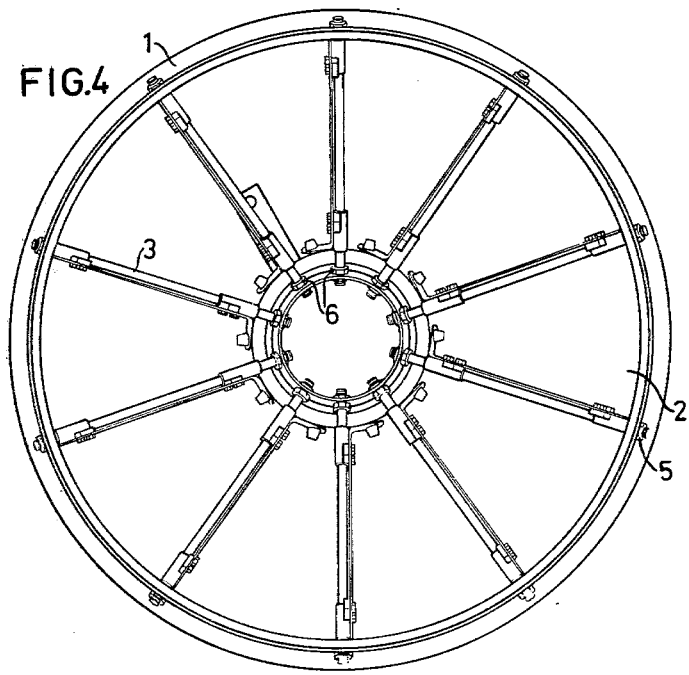

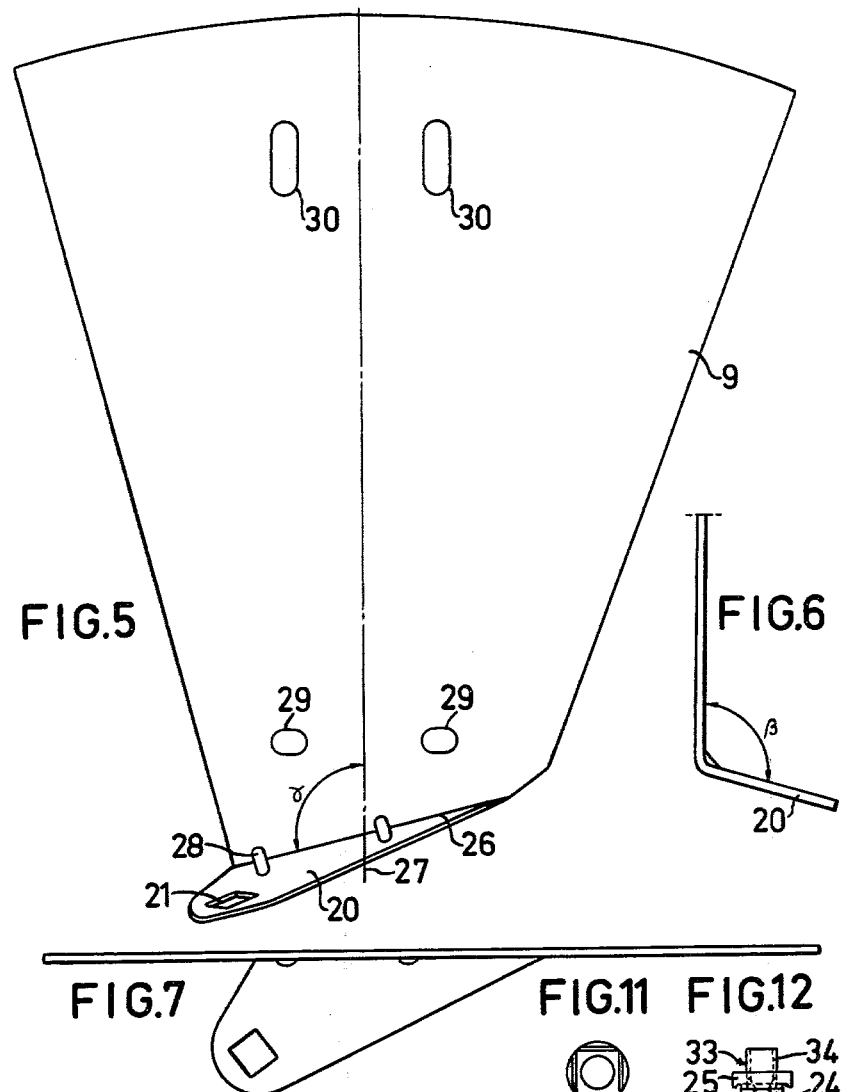
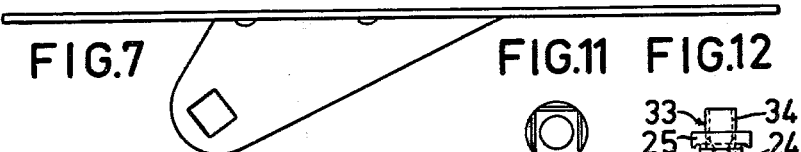
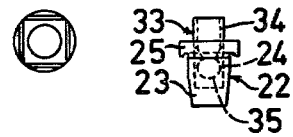
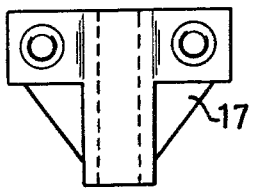
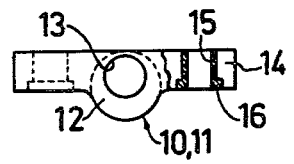

FLOW REGULATOR

The present invention concerns a flow regulator of the type having a casing and a plurality of radially-disposed blades which may be rotated about radial axes to regulate the flow through the casing. In one limit position, the flat faces of the blades face the flow to limit the flow through the casing and in the other limit position, the edges of the blades face the flow to afford maximum flow therethrough. In the intermediate positions, the blades direct the air into a swirling flow.

Flow regulators of this type are particularly designed to be mounted in a blower inlet and the main purpose is to regulate incoming flow of gas by achieving an infinitely-variable rotation or swirling of the gas flowing into the impeller, preferably in the same rotational direction as the impeller. Owing to this preliminary rotation of the gas, the impeller cannot transfer full effect to the gas so that the desired flow control is achieved simultaneously with a reduction in the power needed for the impeller.

Such a flow regulator can, of course, be arranged anywhere along the path of flow for a gas stream where the variable flow control can be utilized.

For this object, it is already known to arrange a number of shafts at least principally in a radial manner in the tubular passage for a gas flow, each shaft bearing its own broad planar blade, which, through pivoting about the shaft, can be induced to assume different positions, e.g. between a completely open position where the blade plane extends substantially axially to the tubular passage, and a completely closed position wherein all of the blade planes principally coincide to one single radial plane transverse to the tubular passage. In the prior art devices, a pivotal or rotative operation is transferred simultaneously to all of the blades and their shafts by externally arranged levers, which are interconnected via an adjusting ring, a linkage or a cable or the like. For this purpose, the blade shafts are rotatably journalled either within the area of the tubular casing surrounding the passage, and/or in a central hub within the casing and extend with their outer ends through the casing in order to there support the stated levers which extend out from the shafts in radial direction and are coupled at their ends to the aforesaid adjusting ring or the like, which concentrically surrounds the casing. In one previously known case, the shaft is bent to cause its outer end to form the adjusting lever. Examples of such previously known apparatus are shown in Swedish Pat. No. 318,054; German OS Nos. 2,113,194, 2,250,559; and AS No. 1,041,203, as well as U.S. Pat. Nos. 2,435,092 and 2,621,848. All of these previously proposed solutions comprise an outer adjusting ring or the like cooperating with rotatably mounted stationary blade shafts.

It can easily be seen that these previously presented proposals are relatively complicated in different respects. Moreover, all of the parts of the entire system are very sensitive to misadjustment or other malfunction, which can easily arise, e.g. when the unprotected outer adjusting ring is subjected to some damage. If the outer adjusting ring is only slightly deformed, irregularities in the blade adjustment result immediately, or else the entire system is put out of operation. Thus, post-adjustments often become necessary. Furthermore, the outer adjusting ring or the like is not entirely satisfactory since relatively great adjusting movements are required with increased friction and wear resulting. Also, special bearings are required for the shafts, which cause substantially increased expense of material and manufacturing costs. Furthermore, the stability suffers for the most part because the shafts are rotatably arranged, since great forces affect the blades and with them the shafts. These conditions are revealed very distinctly by U.S. Pat. No. 2,435,092, where special spokes are arranged to reinforce the blade shafts, or by U.S. Pat. No. 2,621,848 which also shows that an external anchoring of an inner hub is a necessity from the viewpoint of stability. In the cases where only one outer bearing is provided for the blade shafts, the risk is very great that during operation the blades are going to flap or vibrate, whereby the entire construction is subjected to great wear and the life span of which becomes very limited unless the blade is made very thick which obstructs gas flow. In such cases, greater requirement is also placed on the strength of the material in the casing.

The object of the present invention is to counteract and, as extensively as possible, to eliminate the above stated disadvantages. In this connection, it is a particular object of the invention to achieve a very stable and simple, as well as inexpensive, construction which can withstand great strains, and which has a very long life span.

A further and special object of the invention is to confront the problem of friction and consequent resulting wear, as well as to eliminate the detrimental effect of irregularities in the material sections as well as to make replacement of individual members possible without having to dismantle the entire flow regulator.

These objects are achieved in that a flow regulator of the stated type according to the invention is provided with shafts in the flow casing on which the damper blades pivot under the control of a common adjusting member. Prototypes of such a flow regulator have proved to function altogether excellently and meet the expectations which have been placed on the invention.

Owing to its simple and reliable construction and the remaining characteristics, the flow regulator according to the invention is practically maintenance free, and manufacture and assembly of the parts can be achieved without difficulty by untrained personnel after simple instructions.

Further characteristics and advantages of the invention are revealed in the following description and accompanying drawings. These drawings show:

FIG. 1 is a preferred embodiment of a flow regulator according to the invention in completely closed position seen from in front in axial direction;

FIG. 2 shows the flow regulator according to FIG. 1 seen from behind in axial direction;

FIG. 3 is a view corresponding to FIG. 1 in completely open position;

FIG. 4 is a view corresponding to FIG. 2 in completely open position;

FIG. 5 is a preferred embodiment of an adjustable damper blade according to the invention in planar view;

FIG. 6 is a fragmentary view of the blade according to FIG. 5 seen in the direction of the arrow A in FIG. 5;

FIG. 7 shows the blade according to FIG. 5 seen from above in FIG. 5;

FIG. 8 shows a blade bearing included in FIGS. 1-4 seen on the side which is turned from the blade;

FIG. 9 shows the blade bearing according to FIG. 8 seen from the left in FIG. 8;

FIG. 10 shows the same blade bearing seen from above in FIG. 8, partially in cross-section;

FIG. 11 shows a support bearing included in FIGS. 1-4 seen in direction toward the end turned outward;

FIG. 12 shows the support bearing according to FIG. 11 seen in a side view; and

Figure 13:
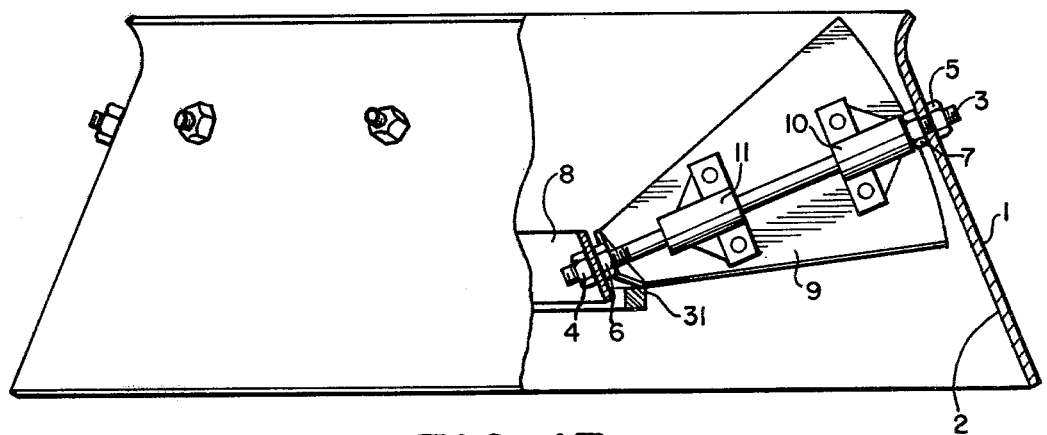
FIG. 13 is a view of the regulator in side elevation with a portion broken away to show a blade thereof in the open position.

In the drawing, 1 designates a ring-shaped tubular casing enclosing a gas passage 2, preferably within an area in front, i.e. in the inlet to a blower, not shown. It can, of course, be arranged anywhere in the gas passage. The casing 1 can be constructed as a separate part or may be included as a section in a blower inlet, a gas line, or the like. In the example illustrated, the casing has converging form in the direction of flow, with a slight diverging at the end located downstream. This is only one practical example and the casing can, of course, have any form.

With their outer ends, blade shafts 3 are anchored in the casing, which shafts can consist of round iron bars with threaded end sections, and which are orientated at least primarily in radial direction relative to the casing 1. As revealed by the drawing, the shafts extend inwardly at equally-spaced angular distance about the circumference of the casing, and terminate a short distance from the central axis of the casing. The shafts extend through holes in the casing and are anchored by means of nuts on the outer side and cooperate with lock nuts 7 on the inner side of the casing. Similar anchoring is provided at the inner ends of the shafts, which extend through a hub 8 and are anchored on its inner side by means of nuts 4, which can cooperate with lock nuts 6 on the outer side of the hub. The hub is namely a conical ring whose slope corresponds to an inclination of the shafts. Also, in the casing 1, the described convergence suitably corresponds to the inclination of the shafts so that the shafts are oriented at right angles relative to their areas of attachment on the casing.

In such a manner, an extremely stable frame with fixed shafts has been created, which frame is capable of absorbing and resisting very great forces of varying type without injuriously affecting the characteristics of this flow regulator.

On every shaft 3, an adjustable damper blade 9 is attached, suitably consisting of a completely flat body, whose sides are formed by at least approximately radially oriented edges, and whose outer edge is curved in the form of an arch at a distance following the contour of the casing when the blades are in closed position. The journalling and anchoring of the blades on each of their shafts 3 occurs with the help of an outer bearing 10 and an inner bearing 11, which suitably have the same design. Such a bearing is shown in FIGS. 8-10 and is suitably made of one piece of plastic which does not require lubrication and which can withstand friction, heat, cold and other strains. Each bearing suitably comprises a pipe section 12 with through-going shaft bore 13 and mounting shanks 14 extending out in lateral direction at the one end, which shanks are suitably constructed to be through-going on the one side, i.e. forming a through-going flat surface under the pipe section located within the area of the shanks, while on the other side, the pipe section forms an outward protecting rounded profile. Each of the shanks 14 accommodates its through-going bolt hole 15 which can be fitted with a bushing 16, if so desired. Lastly, a triangular brace section 17 can extend between the free pipe section 12 and the shanks 14.

These blade bearings 10 and 11 are preferably arranged on the side of the blades which, in closed position, is turned away from the flow and are attached to the blades by blade bolts 18 which extend from the side of the blades which are exposed toward the flow, through the blades and the shanks 14 in order to at that location be secured by means of blade nuts 19. Other alternatives can, of course, at this point be conceived, in particular hexagonal holes may be provided in the shanks for non-turnable accommodation of the nuts 19. The anchoring of the blade bearings and the blades will be further described somewhat later.

Each blade forms a foot 20 at its inner end, as revealed in more detail by FIGS. 5-7. The foot is preferably manufactured in one piece with the blade in particular through bending. Such bending occurs around a shoulder line 26 enclosing a particular angle $\alpha$ with the pivotal axis 27 through the plane body portion of the blade. In a preferred embodiment, this angle $\alpha$ is 104.5°. As revealed in particular by FIG. 6, the foot assumes a particular angle $\beta$ relative to the blade body portion, which angle in a preferred embodiment is a 105° angle. Each foot accommodates a bearing hole 21 which is suitably designed non-circular, e.g. quadrilateral, in the present instance, square.

The bearing hole 21 is designed to accommodate a collar bearing 22 consisting of a collar bearing journal 23 which extends from a base disc 25, both of which accommodate an axial and central collar bearing socket 24 which can blindly end in the journal 23 in order to extend out through the base disc 25. Such a collar bearing is suitably made of plastic with characteristics which have been described in connection with the blade bearings. The design of the journal 23, at least at the shoulder, conforms to the outline of the bearing hole 21, to prevent relative rotation therebetween. The collar bearing 22 forms a part of the foot 22 and may serve as a crank for adjusting the blades by means of an adjusting ring 31 encircling the hub 8.

Near its inner end, each blade accommodates two inner holes 29 arranged equidistantly from the stated pivotal axis 27. These inner holes 29 can suitably be somewhat oblong, with their long axes perpendicular to the pivotal axis, so that a certain lateral adjustment between the inner blade bearing 11 and the blade and its foot is possible. Furthermore, within its outer area, each blade accommodates two outer holes 30 which are arranged equidistantly from the stated pivotal axis 27, and which preferably are oblong with their long axes parallel to the pivotal axis in order to make possible relative shifting between the outer blade bearing 10 and the blade in the longitudinal direction along the axis 27.

In a preferred embodiment, the design of the blade foot is shown in detail by the drawing, particularly in FIGS. 5-7, and besides the angular relationship between the foot and the body of the blade, the bearing hole 21 lies approximately in a plane perpendicular to the plane of the blade, extending along the left lateral edge of the blade body in FIG. 5. This edge, in open position of the flow regulator, is turned toward the flow. From this it follows that the foot 20 extends obliquely away from the inner end area of the blade in proximity to the edge which is turned toward the flow. In this way, a suitable power transmission is obtained.

Since the flow regulator may be subjected to very strong currents or other strains, reinforcements 28 are therefore suitably arranged in the fold between the inner end of the blade body and the foot, as shown in FIGS. 5–7. It is further shown in FIG. 5 that the blade is divided in longitudinal direction into two sections by the pivotal axis 27, of which sections the one turned away from the free end of the foot is larger than the other section. The larger section lies consequently on the downstream side when the flow regulator is completely open. The outer peripheral area of the edge of this larger section is overlapped, preferably in the direction of flow by the outer peripheral area of the edge of the smaller blade section, as shown in FIGS. 1 and 2. This construction facilitates manufacture and assembly of the unit. It can be mentioned in this connection that the embodiments shown in the drawing figures and described in the preceding text, have been chosen with consideration for asymmetry so that equilibrium prevails at a 15° angle of opening, which must be considered to be an optimal position in order that the forces which must be exerted in order to enlarge or to reduce the angle of opening become minimal. In a preferred embodiment, at least the lateral edges of the larger blade section may be extended inwardly to meet at the central axis of the flow regulator.

The blade foot 20 therefore positions the collar bearing 22 adjacent the periphery of the adjusting ring 31, which is suitably quadrangular in profile and is arranged outside of the hub 8. Furthermore, the adjusting ring is preferably larger in diameter than the hub. Each collar bearing 22 in turn receives in its socket 24 the ball head portion 35 of a collar bearing bolt 33 having a threaded section 34 by which it is screwed into the adjusting ring 31. The bolt 33 extends out from the adjusting ring 31 in radial direction to penetrate into the socket 24 of the collar bearing. The head 35 preferably is connected to the section 34 by a reduced throat section and can extend into the collar bearing 22 at a lesser distance than that shown in FIG. 12 to constitute a ball and socket joint. Concerning this depth of penetration, this can be variably chosen optimally for each individual case. To avoid inadvertently changing position of the bolt 33 after installation, it is preferably fixed in its position by gluing or welding.

In accordance with a preferred embodiment, the plane of the blade foot 20 is tangent to the adjusting ring 31 when the angle of opening for the blades is 45°. In this position, the plane through the pivotal axis and the plane through the bearing hole 21 are preferably oriented axially.

Lastly, the flow regulator according to the invention comprises an actuator or operator 32 running out from the adjusting ring 31 and leading to an adjusting mechanism, not shown in more detail. The actuator and the adjusting ring are moved obliquely in circumferential and axial directions to effect a pivotal or rotative displacement of the blades 9.

It has already been mentioned in the beginning of the description that the flow regulator according to the invention comprises a stable framework of non-moving parts, namely the casing 1 with the shafts 3 and the hub 8. The blade bearings 10 and 11 are already fitted onto the shafts. The individual blades can easily be mounted on this frame, whereby the adjusting ring 31 is immediately held with mounted collar bearing bolts 33 and collar bearings 22 in position. With help of the described bolt and nut attachment means, the blades 9 are mounted on the bearings 11 and 12, in the sequence that the blade foot 20 with collar bearing 22 is brought to first bear against the adjusting ring 31. Proceeding from this position, in which each blade must be held, each outer blade bearing 10 is then extended outward so that the pipe section 12 bears against respective lock nut 7. The shifting of the outer blade bearings in axial direction is, of course, easily possible owing to the outer holes 10 which are oblong in a direction parallel to the shaft. Then the bolts 18 and the nuts 19 are tightened so that relative shifting between outer blade bearings and blades is no longer possible. Each inner blade bearing 11 has to then assume a dependent position which is dependent from both of the end points of support. Any axial shifting between inner blade bearings and blades is, of course, not needed in this case in axial direction because the bearing can freely be shifted along the shaft within this area. On the other hand, a certain lateral adjustment can be desirable which is why the holes 29 are somewhat oblong, perpendicular to the pivotal axis 27. Lastly, the connection between the bolts 18 and the nuts 19 are tightened in the area for the inner blade bearings so that each blade obtains a stable support in this area.

The advantages of the invention are many and rather apparent. Owing to the stationary frame without any moving parts, a very high level of stability is attained. Any complicated bearings for the shafts can, in this way, be avoided completely, thereby saving two bearings per shaft, since each movable shaft requires two bearings, which, in any case, would not be capable of excluding undesired vibrations. Even the very complicated anchoring of a movable inner adjusting ring in the outer casing or another stationary part in connection with the movable shafts is consequently completely avoided. It can be asserted that the flow regulator according to the invention is maintenance free, since all of the parts will certainly have a very long life span without requiring any lubrication. Despite the preceding, should any part need to be replaced, e.g. resulting from damage during transportation or the like, only the selected blades or selected shafts need to be replaced without having to disassemble the entire flow regulator. Even eventual distortion or eccentricity in the casing 1 can extremely easily be compensated, since axial displacement of the blade shafts does not have any effect on the functioning of the blades.

A very great advantage is attained because special separate levers and other separate respective movable parts can be completely dispensed with. Instead, according to the invention, each blade is formed with a blade foot in one piece which easily can be done with sufficiently great precision by means of simple punching and bending operations. The precision can actually be much greater compared to the prior arrangements of separate levers and the like. A less expensive, faster and more simple manufacturing is achieved in this manner, while avoiding strains and wear of various types. The invention permits smaller sizes of flow regulators owing to the fact that the structures, according to the invention, require less space compared with prior conventional solutions.

While particular embodiments of the invention have been described above and illustrated in the drawing, they are only to be considered as non-limiting examples, which can be modified and supplemented at will within the scope of the inventive idea and the following claims. It is therefore possible to, maintaining different advantages which the invention has to offer, within the scope of the invention, modify certain parts, e.g. arranging separate levers or the like on the blades, in which connection one consequently still benefits from the advantages of the stable frame. If blades with feet formed on them in one piece are chosen, the latter can, of course, be given a somewhat different form than that which is shown in the drawings. Here a preferred embodiment is in any case shown, in which the lateral edges of the feet coincide with or connect to the lateral edges of the blades at angles at approximately 30° respectively 60° and with a circular rounded section as a free end for each blade foot, but here one can, of course, conceive other possible embodiments while maintaining essential advantages such as those described in the preceding text. Even the blade bearings can, of course, be designed in a different way. Since the invention has multivarious and essential advantages, it is therefore even conceivable that some solution in a special case would consist of rotatable blade shafts despite the fact that this must be considered to be a less suitable solution. Of the blade sections which overlap one another, each one can be designed so that the overlaying section is, by means of bending, somewhat sunken relative to the plane of the blade intrinsically for tighter bearing down of the overlying section.

We claim:

1. A flow regulator for controlling a gas flow, a tubular casing having a gas-flow passage therethrough, a plurality of radial shafts in said casing, an adjustable blade mounted for pivotal movement on each shaft axis, each blade extending from said casing inwardly and ending adjacent the geometrical center axis of said tubular casing, a hub located concentrically in said casing adjacent said center axis, an adjusting ring concentrically located on one side of said hub and having an adjusting mechanism, said ring being connected to all blades and being operable to pivot said blades simultaneously and uniformly, the improvement wherein said shafts are fixedly secured to both said casing and said hub, and that each blade is pivotally mounted on its shaft by means of an outer bearing adjacent said casing and by means of an inner bearing adjacent said hub, said outer bearing being positioned on said shaft at least indirectly by said casing, and said inner bearing being positioned independently of said hub and that each blade has a protruding crank connected to said adjusting ring for displacement thereby.

2. A flow regulator accordng to claim 1 wherein each bearing comprises a tubular part having a bore surrounding said shaft and mounting shanks extending laterally from said tubular part and having means for receiving releasable fasteners for connecting said bearings and said blades to each other.

3. A flow regulator according to claim 2, wherein said blades have oblong holes for receiving said fasteners, the holes associated with said outer bearing having their long axes parallel to the axis of the associated shaft, and the holes associated with said inner bearing having their long axes perpendicular to the associated blade shaft axis.

4. A flow regulator according to claim 1, wherein said protruding crank comprises a foot portion of its adjusting blade made in one piece with said blade and is separated therefrom by a bending line.

5. A flow regulator according to claim 4, wherein the body of said blade is completely flat, the bending line of said foot being at an angle with the axis of the associated shaft of at least 104.5° and wherein said foot includes an angle with the blade plane of at least 105°.

6. A flow regulator for controlling a gas flow, a tubular casing having a gas-flow passage therethrough, a plurality of radial shafts in said casing, an adjustable blade mounted for pivotal movement on each shaft axis, each blade extending from said casing inwardly and ending adjacent the geometrical center axis of said tubular casing, a hub located concentrically in said casing adjacent said center axis, an adjusting ring concentrically located on one side of said hub and having an adjusting mechanism, said ring being connected to all blades and being operable to pivot said blades simultaneously and uniformly, the improvement wherein said shafts are fixedly secured to both said casing and said hub, and that each blade is pivotal on its shaft and has a protruding crank connected to said adjusting ring for displacement thereby, said protruding crank being secured to said adjusting ring by a ball and socket joint.

7. A flow regulator according to claim 6, wherein said joint comprises a support bearing having a part projecting from a base disc, said part having a non-circular outline inserted into a correspondingly non-circular bearing hole in said crank, said base disc being positioned between said crank and said adjusting ring.

8. A flow regulator according to claim 7, wherein said projecting part has a central bore ending blindly in said part to constitute the socket of said ball and socket joint.

9. A flow regulator according to claim 7 wherein said protruding crank extends obliquely away from the inner end of said blade to intersect a plane perpendicular to said flat body portion extending along one longitudinal edge of said blade which is intended to be turned towards said gas flow, and wherein further said bearing hole is located approximately in said plane.

10. A flow regulator for controlling a gas flow, a tubular casing having a gas-flow passage therethrough, a plurality of radial shafts in said casing, an adjustable blade mounted for pivotal movement on each shaft axis, each blade extending from said casing inwardly and ending adjacent the geometrical center axis of said tubular casing, a hub located concentrically in said casing adjacent said center axis, an adjusting ring concentrically located on one side of said hub and having an adjusting mechanism, said ring being connected to all blades and being operable to pivot said blades simultaneously and uniformly, the improvement wherein said shafts are fixedly secured to both said casing and said hub, and that each blade is pivotal on its shaft and has a protruding crank connected to said adjusting ring for displacement thereby, each adjustable blade being divided into two longitudinally-extending parts by the associated shft, one of said parts being greater in width than the other part, the wider part being turned away from said gas flow when the flow regulator is entirely open.

* * * * *